US009447972B2

(12) United States Patent
Jause et al.

(10) Patent No.: US 9,447,972 B2
(45) Date of Patent: Sep. 20, 2016

(54) COOLED COMBUSTOR SEAL (71) Applicant: United Technologies Corporation, Hartford, CT (US)

(72) Inventors: Jonathan M. Jause, Manchester, CT (US); Kevin Joseph Low, Portland, CT (US); David Kwoka, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 493 days.

(21) Appl. No.: 13/686,303

(22) Filed: Nov. 27, 2012

(65) Prior Publication Data

US 2014/0144148 A1 May 29, 2014

(51) Int. Cl.
| | |
|---|---|
| *F02C 7/28* | (2006.01) |
| *F23R 3/00* | (2006.01) |
| *F02C 7/20* | (2006.01) |
| *F02C 7/12* | (2006.01) |
| *F02C 7/26* | (2006.01) |
| *F02C 7/24* | (2006.01) |
| *F23R 3/04* | (2006.01) |

(52) U.S. Cl.
CPC ............... *F23R 3/002* (2013.01); *F02C 7/12* (2013.01); *F02C 7/20* (2013.01); *F02C 7/24* (2013.01); *F02C 7/26* (2013.01); *F02C 7/28* (2013.01); *F23R 3/04* (2013.01); *F23R 2900/00012* (2013.01)

(58) Field of Classification Search
CPC .............. F02C 7/12; F02C 7/20; F02C 7/24; F02C 7/26; F02C 7/28; F02C 7/266; F02C 7/32; F23R 3/002; F23R 3/04; F23R 3/045; F23R 3/42
USPC .................................................... 60/752, 796
See application file for complete search history.

(56) References Cited

U.S. PATENT DOCUMENTS

| | | | |
|---|---|---|---|
| 7,013,634 | B2 | 3/2006 | Pidcock et al. |
| 7,216,488 | B2 | 5/2007 | Howell et al. |
| 2005/0028528 | A1 | 2/2005 | Hernandez et al. |
| 2007/0068166 | A1 | 3/2007 | Gautier et al. |
| 2011/0005231 | A1* | 1/2011 | Low .............................. 60/740 |
| 2012/0227373 | A1 | 9/2012 | Bunel et al. |

OTHER PUBLICATIONS

International Search Report and Written Opinion for related International Application No. PCT/US2013/063897; report dated Jan. 16, 2014.

* cited by examiner

*Primary Examiner* — Ehud Gartenberg
*Assistant Examiner* — Filippo Manfredi
(74) *Attorney, Agent, or Firm* — Cantor Colburn LLP (57) ABSTRACT

A cooled combustor seal having a plurality of channels enabling cooling air to pass from outside of a combustion chamber to cool an area inside the combustion chamber around the seal is disclosed. The channels may be provided through a slider, a housing, and/or a washer of the combustor seal. One set of channels or multiple of sets of channels may be provided in the combustor seal. Each of these sets of channels may be in the slider, housing, or washer. The cooled combustor seal may be used in conjunction with an igniter to purge a cavity between the seal and the igniter.

20 Claims, 5 Drawing Sheets

COOLED COMBUSTOR SEAL

FIELD OF THE DISCLOSURE

The present disclosure generally relates to gas turbine engines and, more specifically, relates to igniter slider seals in gas turbine engines.

BACKGROUND OF THE DISCLOSURE

A gas turbine engine, typically used as a source of propulsion in aircraft or power generation, operates by drawing in ambient air, compressing that air in a compressor section, mixing and combusting the compressed air with a fuel, and then forcing the resulting exhaust gasses through a turbine. The compressor section typically includes a high and low pressure compressor, each having a plurality of rotating blades which rotate relative to a plurality of fixed vanes to compress the ambient air. A portion of the compressed air is used to cool a combustor of the engine while the rest is mixed with the fuel and ignited.

Typically, an igniter generates an electrical spark to ignite the air-fuel mixture. The products of the combustion and the remains of the air-fuel mixture then travel out of the combustor as exhaust and through a turbine section. The turbine section, having a high and low pressure turbine each with a plurality of blades extending from a center body, is forced to rotate as the exhaust passes through the turbine blades. The turbine section and the compressor section are connected to a pair of engine shafts concentrically mounted running through the center of the engine. Thus, as each turbine rotates from the exhaust, the corresponding compressor rotates to bring in and compress new air. Once started, it can thereby be seen that this process is self-sustaining.

Combustors for gas turbine engines typically have a combustor shell and a combustor liner inside the shell which thereby defines an air passage therebetween. More specifically, in an annular combustor there may be an outer shell and outer liner, an inner shell and inner liner with air passages between both sets of shells and liners.

The outer liner may be disposed radially inside the outer shell and the inner liner may be disposed radially outside of the inner shell. In addition, a combustion chamber is provided between the inner and outer liners. In such a combustor, typically at least one igniter is disposed in at least one opening provided through the outer combustor shell and the outer liner. In some combustors, the liners may be segmented into panels, with one panel of the outer liner being referenced to as an igniter panel, and which includes the at least one igniter opening.

To prevent the compressed air from outside of the combustion chamber, typically used for cooling the combustion chamber, from entering the combustion chamber through the igniter opening or opening, a seal is typically positioned around each igniter. But for such a seal, air could pass around the igniter and into the combustor chamber. This might detrimentally affect engine performance in terms of ignition of the air-fuel mixture, or disruption of the flow of the air-fuel mixture in the combustion chamber. The seal may also prevent combustion gases from escaping the combustion chamber into the area around the combustion chamber, which might also detrimentally affect engine performance.

In prior art engines, no extra cooling for the igniter and the area around the igniter was provided. However, as gas turbine combustion engines have advanced, temperatures in the combustion chamber, and more specifically the area around the igniter, have increased during operation. These increased temperatures can damage the outer liner and outer shell of the combustor. For example, a crack in the igniter panel and/or outer shell can form from excessive heating of the igniter panel and/or insufficient cooling. Such deformations of the igniter panel and/or shell can, among other things, cause degradation in the igniter operation, thereby necessitating the repair or replacement of engine components.

SUMMARY OF THE DISCLOSURE

In accordance with one aspect of the disclosure, a combustor seal is disclosed. The seal may include a housing, a slider, and a washer. The housing may further include an inner wall, an outer wall, and a housing floor. The housing floor may connect a radially outward end of the inner wall to a radially inward end of the outer wall. The inner wall may define a central hole. The slider may include a neck and a base. The neck may define a central aperture and the base may extend away from the central aperture and a radially inward end of the neck. The slider base may be in contact with the housing floor. The housing central hole and slider central aperture may be aligned. The washer may be attached to a radially outward facing surface of the housing which may retain the slider base in the housing. There may be a plurality of channels communicating through the combustor seal.

In a refinement, the plurality of channels may be provided in the slider.

In a further refinement, the plurality of channels may be vertical slots provided in an interior surface of the neck of the slider.

In another further refinement, the plurality of channels may be holes communicating through the neck from an exterior surface of the neck to an interior surface of the neck.

In another further refinement, the plurality of channels may be slots provided in a radially inward facing surface of the slider base.

In yet another further refinement, the plurality of channels may be holes communicating through the base of the slider from a radially outward facing surface of the base to a radially inward facing surface of the base.

In another refinement, the plurality of channels may be provided in the housing.

In a further refinement, the plurality of channels may be slots provided in a radially outward facing surface of the housing floor.

In another further refinement, the plurality of channels may be holes communicating through the inner wall from an outer surface of the inner wall to an inner surface of the inner wall.

In another refinement, the plurality of channels may be provided in the washer.

In yet another refinement, the plurality of channels may be provided in multiple sets, each set being provided in the slider, the housing, or the washer.

In yet another refinement, the plurality of channels may be concentrated in a predetermined area of the seal.

In accordance with another aspect of the disclosure, a combustor is disclosed which may include a shell, a liner, and a seal. The seal may further include a housing, a slider, and a washer. The housing may be connected to a shell and may include an inner wall, an outer wall, and a housing floor. The housing floor may connect a radially outward end of the inner wall to a radially inward end of the outer wall. The inner wall may define a central hole aligned with holes communicating through the shell and liner. The slider may include a neck and a base which may extend away from the central hole and from a radially inward end of the neck. The slider base may be in contact with the housing floor. The neck may define a central aperture aligned with the shell and liner holes. The washer may be attached to a radially outward facing surface of the housing outer wall and may retain the slider base in the housing. A plurality of channels may communicate through the seal.

In a refinement, the plurality of channels may communicate through the slider.

In another refinement, the plurality of channels may communicate through the housing.

In yet another refinement, the housing, slider, seal washer may seal an igniter in an igniter hole.

In accordance with yet another aspect of the disclosure, a method of cooling an igniter and an area around an igniter of a gas turbine engine combustor is disclosed. The method may include allowing cooling air to pass from outside the combustor through a plurality of channels which may communicate through a seal. The seal may be positioned around an igniter. The method may further include purging a cavity, which may be defined by the igniter and the seal, of hot air with the cooling air.

In a refinement, the cooling air may pass through a slider to enter the combustor.

In another refinement, the cooling air may pass through a housing to enter the combustor.

In yet another refinement, the cooling air may pass through a washer to enter the combustor.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
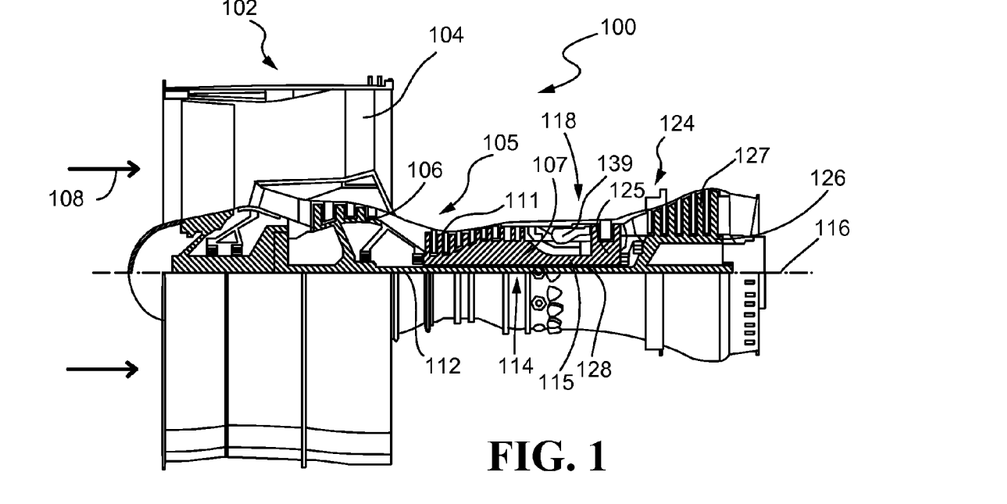
FIG. 1 is a cross-sectional view of a gas turbine engine constructed in accordance with the present disclosure.
Figure 2:
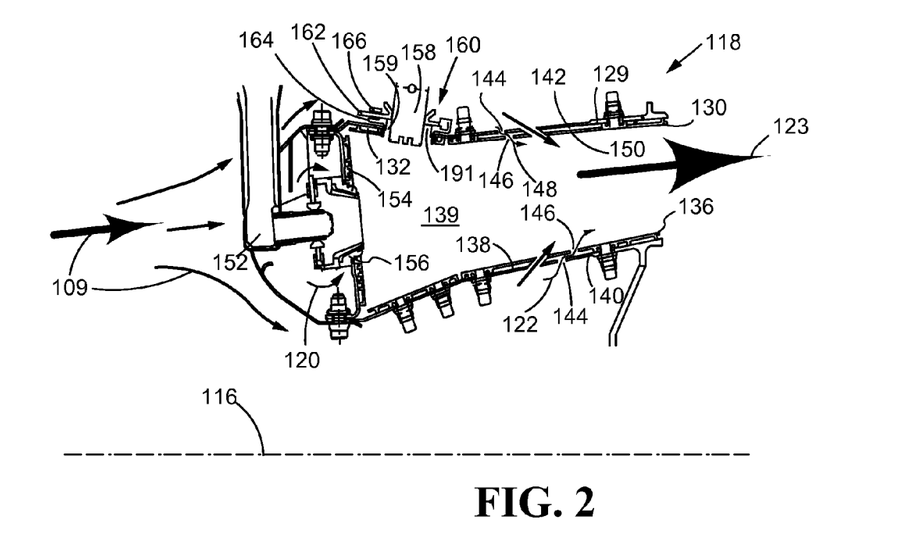
FIG. 2 is a cross-sectional view of an annular combustor constructed in accordance with the present disclosure.

Referring now to the drawings, and with specific reference to FIGS. 1 and 2, a gas turbine engine constructed in accordance with the teachings of the present disclosure is generally referred to by reference numeral 100, is disclosed. The gas turbine engine 100 may include an engine housing 102, with engine supports 104 connecting internal components of the gas turbine engine 100 to the engine housing 102. The engine 100 includes a compressor section 105, to draw in ambient air 108 into the engine 100 and compress the air into compressed air 109. The compressor section 105 may be provided at a front end of the engine 100 and may be a dual spool compressor, having a low-pressure compressor 106 and a high-pressure compressor 107, each compressor including a plurality of blades 111 extending radially outwards between a plurality of stator vanes. The low-pressure compressor 106 is connected to a first end 112 of a first shaft 114 which extends through the engine 100 along a central axis 116. The high-pressure compressor 107 is connected to a second shaft 115 concentrically mounted around the first shaft 114.

The compressed air 109 then enters a combustor 118 as combustion air 120 and cooling air 122 and exits as exhaust 123. The exhaust 123 passes through a turbine section 124, which may have a high-pressure turbine 125 and a low-pressure turbine 126, each including a plurality of blades 127 extending radially outward between a plurality of stator vanes. The high-pressure turbine 125 is connected to the second shaft 115 and the low-pressure turbine 126 is connected to a second end 128 of the first shaft 114. The exhaust 123 causes the turbine section 124 to rotate, which rotates the shafts 114 and 115 causing the compressor section 105 to rotate as well.

As seen in FIG. 2, the combustor 118 may be annular in shape centered on central axis 116, but any other shapes are possible. The annular combustor 118 of FIG. 2 includes a pair of combustor shells and liners. More specifically, an outer shell 129 of the combustor 118 may be provided with an outer liner 130 radially inside the outer shell 129 and attached to an inner surface 132 of the outer shell 129. Similarly, an inner liner 136 may be connected to an outer surface 138 of an inner shell 140 of the combustor 118. It can therefore be seen that the liners 130 and 136 define a combustion chamber 139 and create a thermal barrier between their associated shells 129 and 140 and the high temperature gases in the combustion chamber 139. In one embodiment, the liners 130 and 136 may be segmented into panels, however such a paneled liner is only an exemplary embodiment and the liners 130 and 136 are not limited to this form.

In the annular combustor 118 of FIG. 2 each shell and liner define an annular air passage 142 therebetween. A plurality of impingement holes 144 communicate through the shells 129 and 140 to allow cooling air 122 to flow into the air passage 142. From the air passage 142, the cooling air 122 flows through a plurality of cooling holes 146 communicating through the liners 130 and 136. As the cooling air 122 passes through the cooling holes 146, the cooling air 122 creates a cooling film 148 on a hot surface 150 of the liners 130 and 136. In so doing, the cooling film 148 reduces the temperature of the liners 130 and 136.

With respect to the fuel needed for combustion, at least one fuel injector 152 may extend through a front wall 154 of the combustion chamber 139 to provide same. While FIG. 2 is depicted as having only one fuel injector 152, any number of fuel injectors 152 are possible. Fuel emitted from the injectors 152 is mixed with the combustion air 120 by an air-fuel mixer 156 to allow for the best possible burn of the fuel.

The air-fuel mixture may be ignited by at least one igniter 158 which may extend through an igniter hole 159 communicating through the outer shell 129 and outer liner 130 of the combustor 118, as in FIG. 2. To prevent compressed air 109 from entering the combustion chamber 139 around the igniter 158 and through the igniter hole 159, a combustor seal 160 is positioned around the igniter 158 as described in further detail below.

Figure 3:
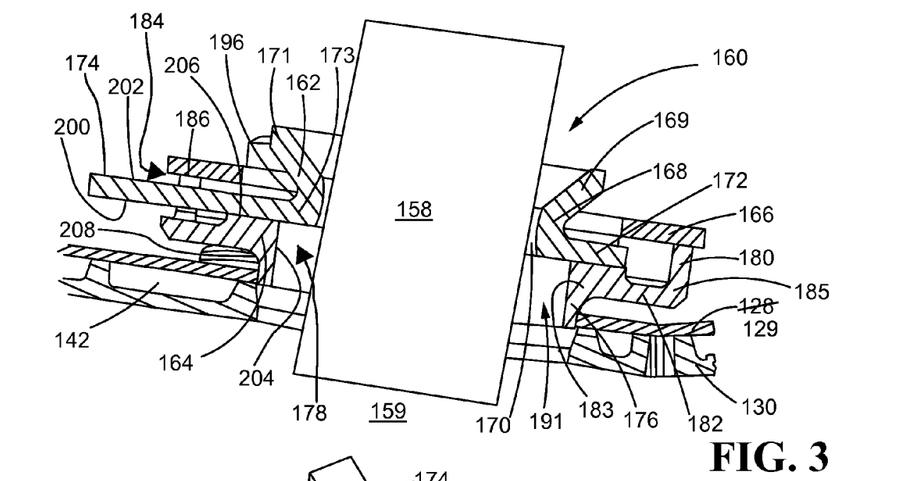
FIG. 3 is a cross-sectional view of a combustor seal built in accordance with the present disclosure around an igniter and on a shell and liner of a combustor.

As shown in FIG. 3, the combustor seal 160 includes a slider 162, a housing 164, and a washer 166. The slider 162 has a neck 168 defining a central hole 170. The slider 162 may also have a flared mouth 169 connected to the neck 168 that is wider in diameter at a radially outward end 171 of the mouth 169 than at the neck 168. The slider 162 further has a flange or base 172 extending away from the central hole 170 and from a radially inward end 173 of the neck 168, which may further have any number of extensions 174. Such extensions may be spaced circumferentially from one another and each extension 174 projects away from the central hole 170. The housing 164 may have an inner wall 176 defining a central aperture 178, which is aligned with the central hole 170 of the slider 162. An outer wall 180 radially surrounds the inner wall with respect to the central hole 170. The walls 176 and 180 of the housing 164 are joined by a housing floor 182, which is connected to a radially outward end 183 of the inner wall 176 and a radially inward end 185 of the outer wall 180. The base 172 of the slider 162 is in contact with the housing floor 182, and each extension 174 protrudes through a gap 184 in the outer wall 180 to prevent the slider seal 162 from rotating with respect to the housing. To retain the slider 162 in the housing 164, the washer 166 is connected to a radially outward facing surface 186 of the outer wall 180 and retains each extension 174 in its associated gap 184.

The inventors have found that cooling air may be provided to the igniter 158 and a portion of the outer liner 130 proximate the igniter 158 to prevent damage to the igniter 158 and liner 130 from excess heating. As shown best in FIG. 4, a plurality of channels 190 may communicate through the combustor seal 160 to allow cooling air 122 to flow around the igniter 158 and liner 130. In addition, as a cavity 191, formed between the igniter 158 positioned in the central holes 170 and 178 and the inner wall 176, may collect hot air during operation, the plurality of channels 190 allow cooling air 122 to purge the cavity 191. More specifically, the channels 190 allow cooling air 122 to pass from outside the combustor 118 into the cavity 191 through channels 190 and in so doing, cool the igniter 158 and the liner 130 around the igniter 158.

Figure 4:
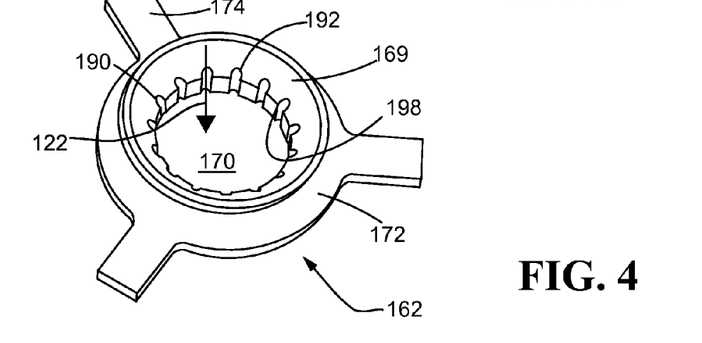
FIG. 4 is a perspective view of one embodiment of a slider built in accordance with the present disclosure and having slots circumferentially spaced in a neck of the slider.
Figure 5:
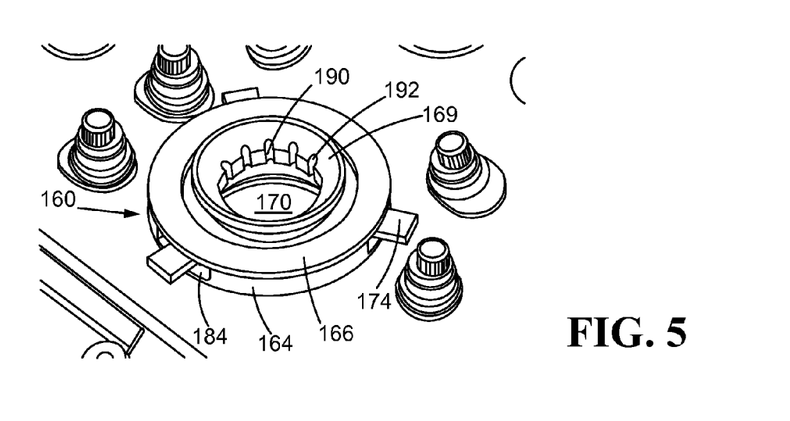
FIG. 5 is a perspective view of another embodiment of a slider built in accordance with the present disclosure and having concentrated slots in the neck.

There may be one set of uniformly spaced channels 190 communicating through the combustor seal 160 as in FIG. 4, or alternately there may be a plurality of sets of channels 190 as in FIGS. 9-11 as will be described in further detail herein. In the embodiment of FIG. 4, the channels 190 are a plurality of uniformly spaced radially extending slots 192 in the neck 168 of the slider 162, or, as shown in FIG. 5, concentrated in one part of the neck 168.

Figure 6:
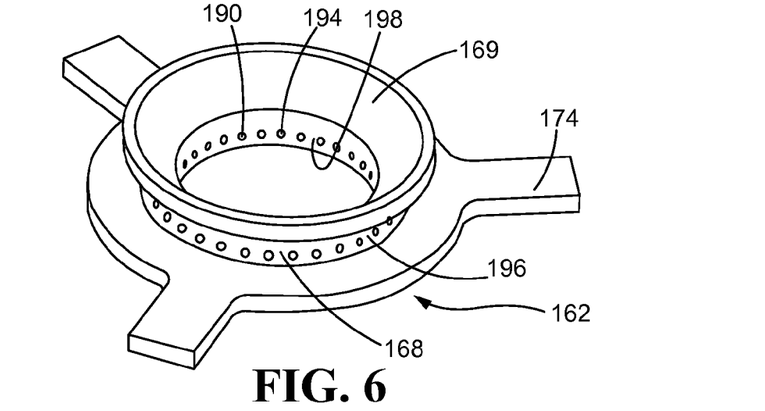
FIG. 6 is a perspective view of another embodiment of a slider built in accordance with the present disclosure and having holes through the neck.

In an alternate embodiment, shown in FIG. 6, the channels 190 are a plurality of holes 194, as opposed to slots, communicating through the neck 168 from an exterior surface 196 to an interior surface 198. The holes 194 may be oriented at any desired angle in reference to the slider neck 168. The holes 194 allow cooling air 122 to pass from outside the combustion chamber 118 to cool the igniter 158. This cooling air 122 flushes the cavity 191 of any hot air which may have collected in the cavity 191 during operation. As used herein, a "hole" in this context is an opening surrounded by the material forming the seal, whereas a "slot" is an opening not surrounded by the material forming the seal, but rather being open on at least one side.

Figure 7:
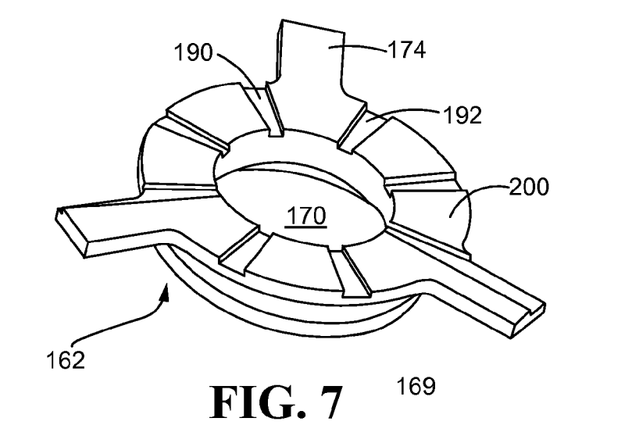
FIG. 7 is a perspective view of yet another embodiment of a slider built in accordance with the present disclosure and having face slots.

In another embodiment, shown in FIG. 7, the channels 190 are a plurality of slots 192 in a radially inward facing surface 200, with respect to the axis 116, of the slider base 172. The slots 192 allow cooling air 122 to flow between the inward surface 200 and the housing floor 182. This cooling air 122 also purges the cavity 191 of hot air and reduces the temperature of the igniter 158 and the outer liner 130 around the igniter 158.

Figure 8:
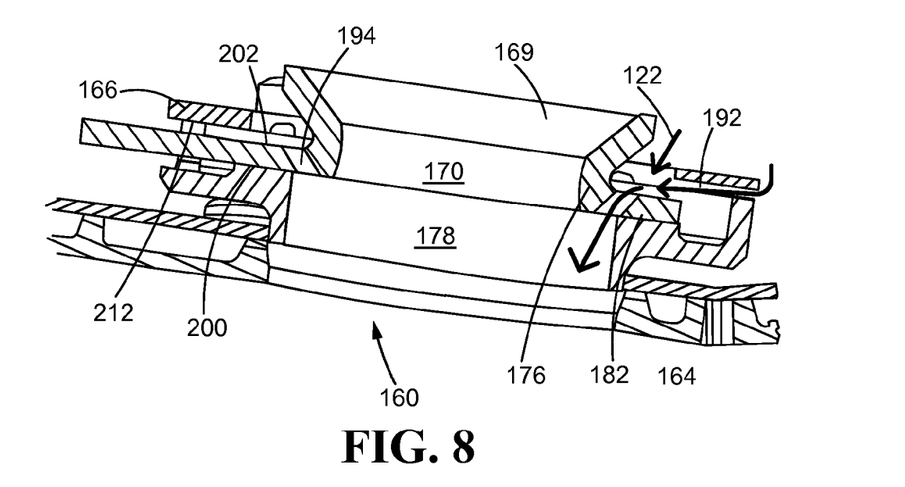
FIG. 8 is a cross-sectional view of one embodiment of a combustor seal built in accordance with the present disclosure and having holes through the base of the slider and slots through a washer.

In yet another embodiment shown in FIG. 8, the channels 190 are a plurality of holes 194 communicating through the base 172 from a radially outward facing surface 202 to the inward surface 200. The holes 194 communicating through the base 172 allow the cooling air 122 to purge the cavity 191 and cool the igniter 158.

Figure 9:
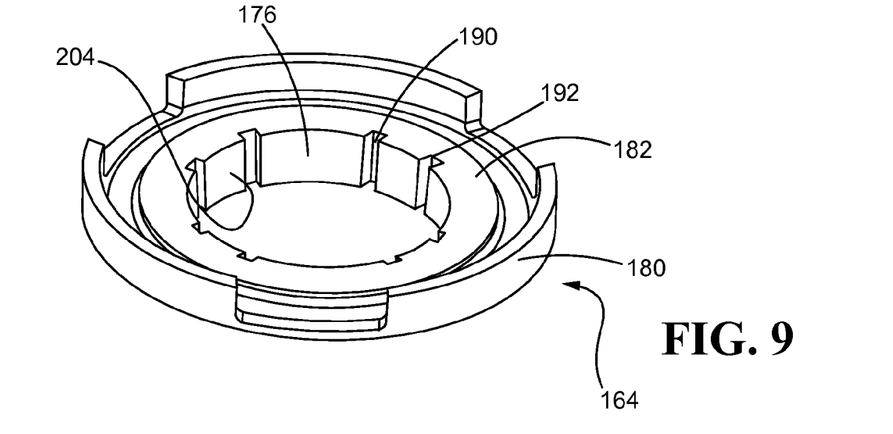
FIG. 9 is a perspective view of one embodiment of a housing built in accordance with the present disclosure and having vertical slots in an inner wall of the housing.
Figure 10:
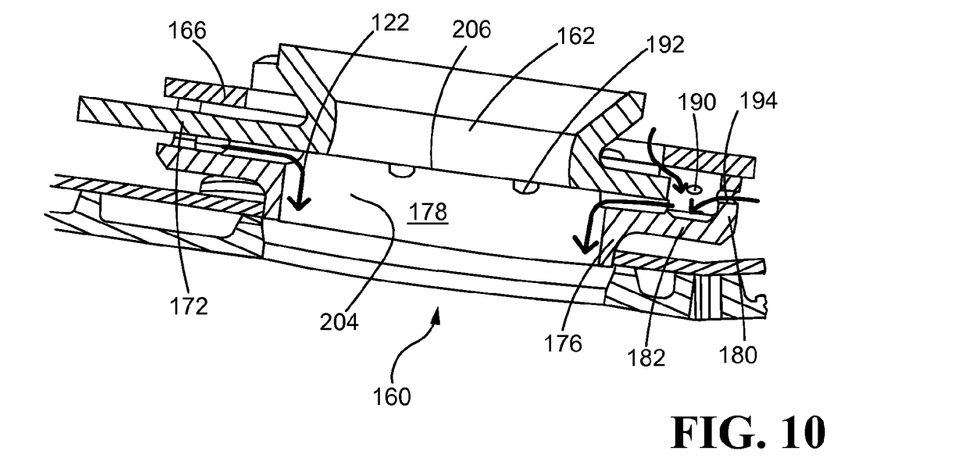
FIG. 10 is a cross-sectional view of one embodiment of a combustor seal built in accordance with the present disclosure and having holes through an outer wall of the housing and slots in a housing floor.
Figure 11:
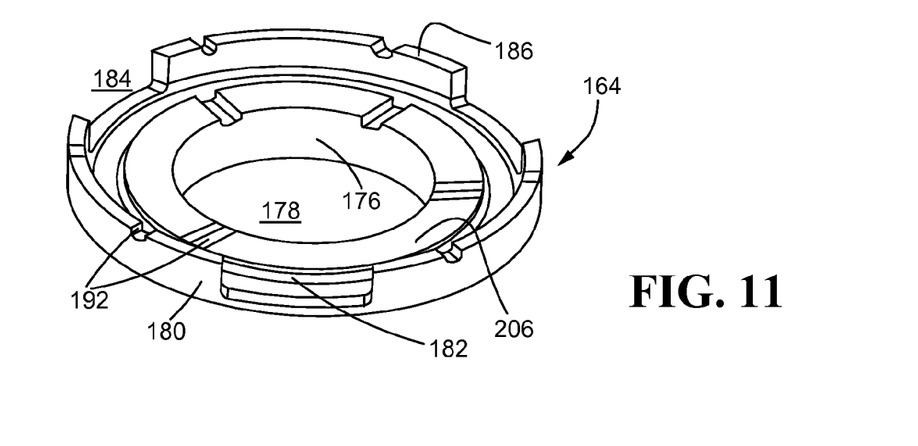
FIG. 11 is a perspective view of one embodiment of a housing built in accordance with the present disclosure and having slots in an outer wall outward surface and in the housing floor.
Figure 12:
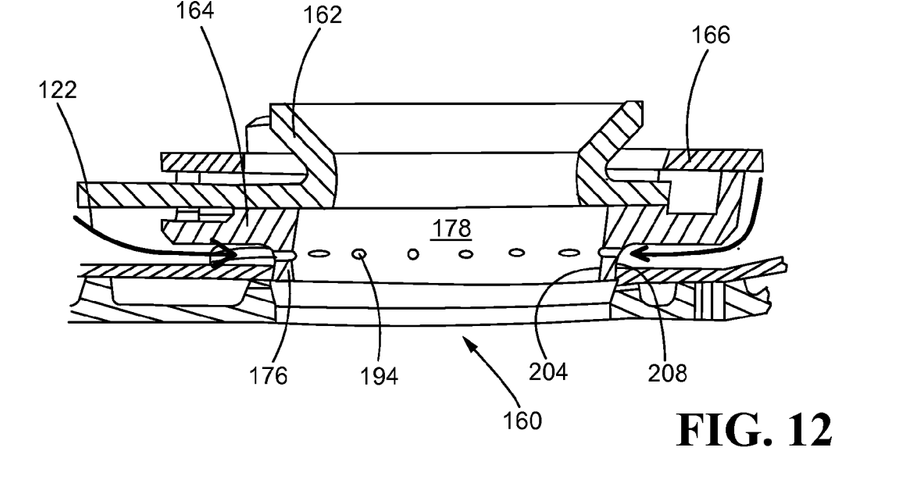
FIG. 12 is a cross-sectional view of one embodiment of a combustor seal built in accordance with the present disclosure and having holes through the inner wall of the housing.

Referring now to FIGS. 9-13, in still further embodiments the channels 190 are provided elsewhere in the seal 160, such as in the seal housing 164. More specifically, there may be a plurality of vertical slots 192 in an inner surface 204 of the inner wall 176 as shown in FIG. 9. In another embodiment, the plurality of channels 190 may be in the outer wall 180. These channels 190 may be holes 194 communicating through the outer wall 180, as in FIG. 10, or slots 192 in the outward surface 186, as in FIG. 11. Also in the embodiments shown in FIGS. 10 and 11, a plurality of slots 192 are provided in a radially outward facing surface 206 of the housing floor 182. In yet another embodiment, the channels 190 may be a plurality of holes 194 communicating through the inner wall 176 from an outer surface 208 to the inner surface 198 as shown in FIG. 12.

Figure 13:
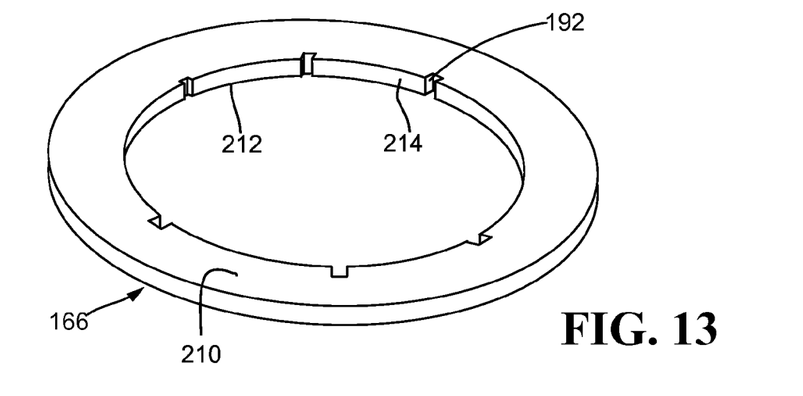
FIG. 13 is a perspective view of one embodiment of a washer built in accordance with the present disclosure and having vertical slots in an inner surface of the washer.
Figure 14:
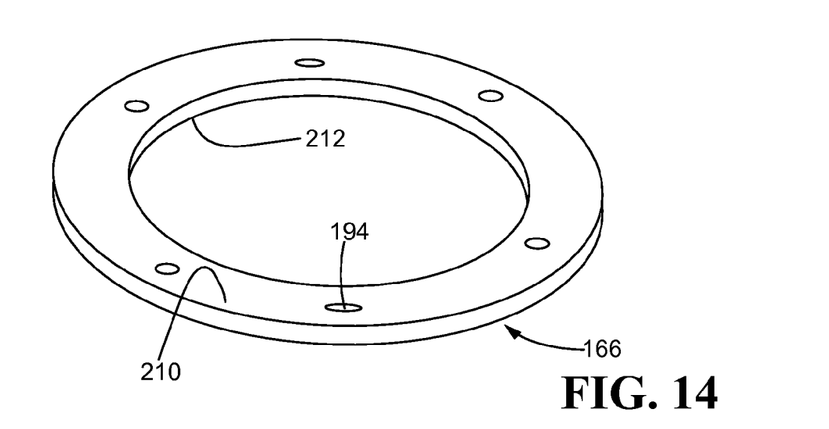
FIG. 14 is a perspective view of another embodiment of a washer built in accordance with the present disclosure and having holes through the washer.

The channels 190 may also be provided in the washer 166, as shown in FIGS. 8, 13, and 14. In FIG. 8, the channels 190 are a plurality of slots 192 in a radially inward facing 212 surface of the washer 166. Alternatively, the channels 190 may be a plurality of slots 192 in an interior surface 214 of the washer 166 from a radially outward facing surface 210 to the inward surface 212 as in FIG. 13. In yet another alternate embodiment, shown in FIG. 14, the channels 190 are a plurality of holes 194 communicating through the washer 166 from the outward surface 210 to the inward surface 212.

While the combustor seal 160 has been described as used in conjunction with an igniter 158, it should be understood that the seal 160 is not confined to only such use and may be used to seal and cool other parts of the gas turbine engine 100, such as but not limited to a swirler or the fuel injector 152.

INDUSTRIAL APPLICABILITY

From the foregoing, it can be seen that the technology disclosed herein has industrial applicability in a variety of settings such as, but not limited to, cooling combustor seals and the area around the combustor seal in a gas turbine engine. The gas turbine engine may be used in conjunction with an aircraft for generating thrust, or in land-based applications for generating power. Using the teachings of the present disclosure, a combustor seal may be constructed to increase cooling flow to reduce the temperature in the area around an igniter, or other feature in which a combustor seal may be used with. This improvement over the prior art may prevent cracking of the outer combustor shell around the igniter during operation.

While the present disclosure has been made in reference to an igniter, a gas turbine engine, and an aircraft, one skilled in the art will understand that the teachings herein can be used in other applications as well, such as for a fuel injector for example. It is therefore intended that the scope of the invention not be limited by the embodiments presented herein to set forth the best mode currently known for carrying out the invention, but rather that the invention includes all embodiments falling within the scope of the appended claims.

What is claimed is:

1. A combustor seal, comprising:
a housing including an inner wall, an outer wall, and a housing floor connecting a radially outward end of the inner wall to a radially inward end of the outer wall, the inner wall defining a central hole, the outer wall having at least one gap and a plurality of holes therethrough;
a slider including a neck and a base, the neck defining a central aperture and the base extending away from the central aperture and a radially inward end of the neck, the slider base including at least one extension extending away from the central aperture and through the gap, the slider being in contact with the housing floor, the housing central hole and slider central aperture being aligned;
a washer attached to a radially outward facing surface of the housing outer wall and retaining the slider base in the housing; and
a plurality of channels communicating through the combustor seal.

2. The seal of claim 1, wherein the plurality of channels are provided in the slider.

3. The seal of claim 2, wherein the plurality of channels are vertical slots provided in an interior surface of the neck of the slider.

4. The seal of claim 2, wherein the plurality of channels are holes communicating through the neck from an exterior surface of the neck to an interior surface of the neck.

5. The seal of claim 2, wherein the plurality of channels are slots provided in a radially inward facing surface of the slider base.

6. The seal of claim 2, wherein the plurality of channels are holes communicating through the base of the slider from a radially outward facing surface of the base to a radially inward facing surface of the base.

7. The seal of claim 1, wherein the plurality of channels are provided in the housing.

8. The seal of claim 7, wherein the plurality of channels are slots provided in a radially outward facing surface of the housing floor.

9. The seal of claim 7, wherein the plurality of channels are holes communicating through the inner wall from an outer surface of the inner wall to an inner surface of the inner wall.

10. The seal of claim 1, wherein the plurality of channels are provided in the washer.

11. The seal of claim 1, wherein the plurality of channels are provided in multiple sets, each set being provided in the slider, the housing, or the washer.

12. The seal of claim 1, wherein the plurality of channels are concentrated in predetermined areas of the seal.

13. A combustor, comprising:
a shell;
a liner inside the shell;
a seal, further including:
a housing connected to the shell and including an inner wall, an outer wall, and a housing floor connecting a radially outward end of the inner wall to a radially inward end of the outer wall, the inner wall defining a central hole aligned with holes communicating through the shell and liner, the outer wall having at least one gap and a plurality of holes therethrough;
a slider including a neck and a base extending away from the central hole and from a radially inward end of the neck, the neck defining a central aperture aligned with the holes communicating through the shell and liner, the slider base being in contact with the housing floor, the slider base including at least one extension extending away from the central aperture and through the gap;
a washer being attached to a radially outward facing surface of the housing outer wall and retaining the slider base in the housing; and
a plurality of channels communicating through the seal.

14. The combustor of claim 13, wherein the plurality of channels communicate through the slider.

15. The combustor of claim 13, wherein the plurality of channels communicate through the housing.

16. The combustor of claim 13, wherein the housing, slider, and washer seal an igniter in an igniter hole.

17. A method of rotationally fixing and cooling an igniter and an area around the igniter of a gas turbine engine combustor, comprising:
mounting the igniter in a slider, said slider having at least one extension;
capturing the slider between a washer and a housing adapted to associate with the extension;
allowing cooling air to pass through a plurality of holes communicating through an outer wall of the housing;
allowing cooling air to pass from outside the combustor through a plurality of channels communicating through a seal positioned around the igniter; and
purging a cavity defined by the igniter and the seal of hot air with the cooling air.

18. The method of claim 17, further including passing the cooling air through the slider prior to entering the combustor.

19. The method of claim 17, further including passing the cooling air through an inner wall of the housing prior to entering the combustor.

20. The method of claim 17, further including passing the cooling air through the washer prior to entering the combustor.

* * * * *